Figure 1:
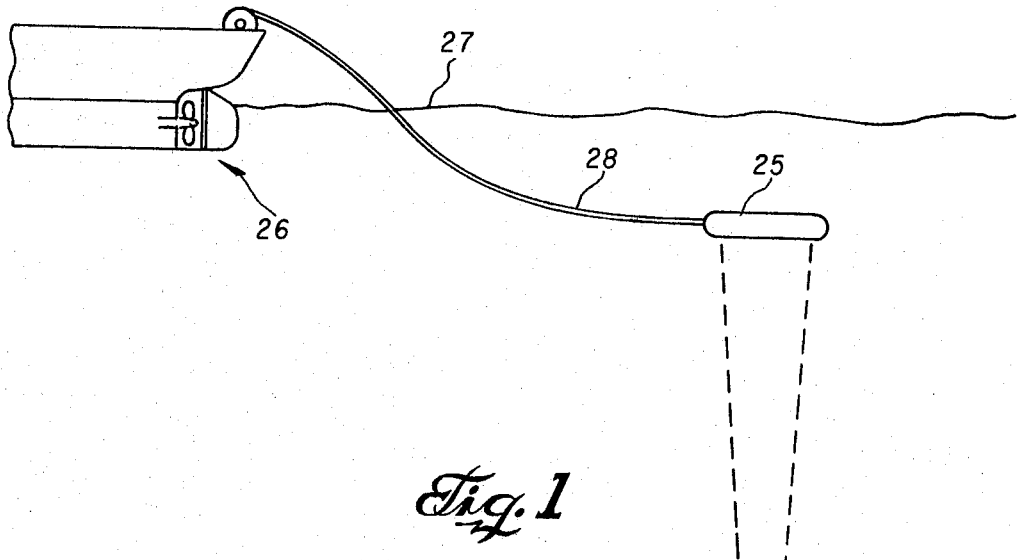

April 25, 1967  B. M. BAKER  3,316,531

RELEASE MECHANISM

Filed Aug. 17, 1965

INVENTOR
BUFORD M. BAKER

BY John E. Vandigriff
ATTORNEY

United States Patent Office 3,316,531
Patented Apr. 25, 1967

3,316,531
RELEASE MECHANISM
Buford M. Baker, Dallas, Tex., assignor to Texas Instruments Incorporated, Dallas, Tex., a corporation of Delaware
Filed Aug. 17, 1965, Ser. No. 505,297
6 Claims. (Cl. 340—7)

This invention relates to release mechanisms and more particularly to a mechanism for releasing submerged objects to enable them to rise to the surface.

In the gathering of oceanographic data, for example earth tremors and other related data, it is often desirable to position detection instruments on the bottom of the ocean and then, at a later time, release the capsule that contains the instruments to permit the capsule to float to the surface. Since the depth of such data gathering instruments may be as much as 20,000 feet, it is necessary that the instrument capsule be placed there and at a later time released. Due to corrosion and other damaging effects of sea water and sediment on the bottom of the ocean, however, release mechanisms for the capsule are often unreliable.

One method used to release an instrument capsule is to couple the capsule to an explosive bolt and detonate the bolt at a desired time with an appropriate signal. When the bolt explodes, the capsule is released, permitting it to float to the surface. However, at depths of 20,000 feet, the water pressure is very high and it is possible that sea water will get into the charge, damaging it so that it will not explode. Also, the pressure may minimize the effects of the explosion so that the bolt is not uncoupled from the capsule and therefore not releasing the capsule.

Another method used in underwater releasing mechanisms is to use a corrosive link, for example magnesium wire, which, after a period of time, corrodes away and releases the capsule. However, such links are good only for relatively short periods of time. But where the period runs into weeks or even months, corrosive links are not reliable timing and releasing devices, since it is difficult to ascertain in advance the length of time necessary for the complete deterioration of a corrosive link. Other factors, such as water salinity, temperature and sediment enter into the life of a corrosive link, making it difficult to calculate the size of the link so as to release the capsule attached to it at a predetermined time.

Therefore, one object of the invention is to provide a mechanism which will release an object underwater at a designated time.

Another object of the invention is to provide a release mechanism which is not adversely affected by its environment over a long period of time.

It is still another object of the invention to provide a release mechanism which will operate at great depths as well as over a long period of time.

Figure 2:
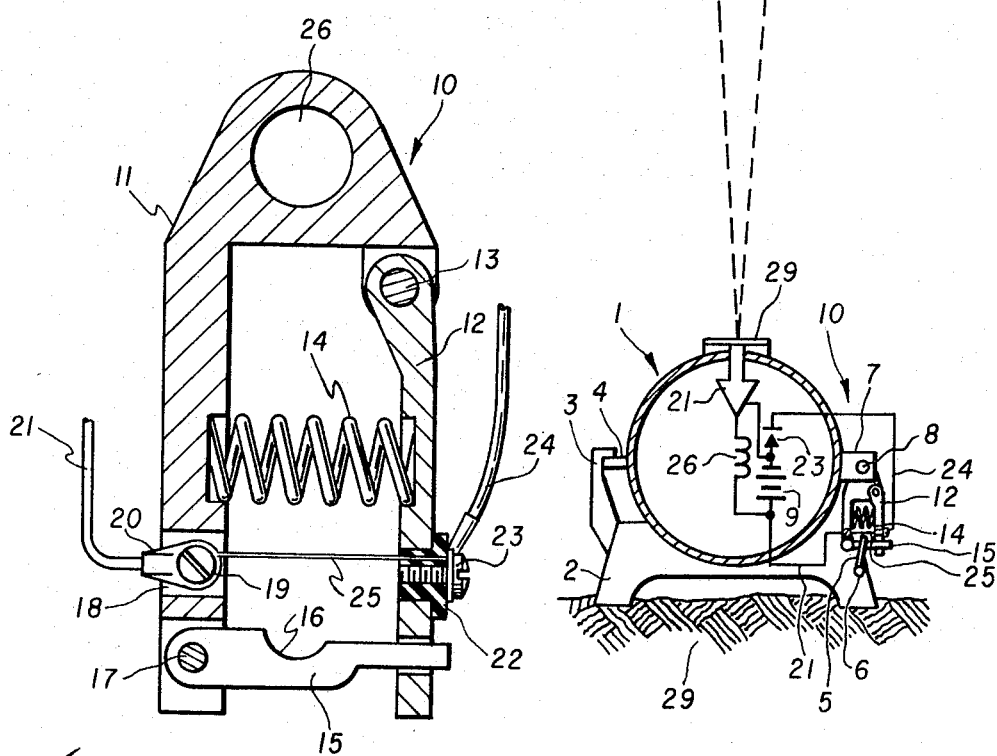

Other objects and features of the invention will become more readily understood from the following detailed description and appended claims when considered in conjunction with the accompanying drawing, in which like reference numerals designate like parts throughout the figures thereof, and in which:

FIGURE 1 is a pictorial view of a seismic system showing the instrument capsule on the bottom of the ocean and having a release mechanism therefor; and FIGURE 2 is a cross-sectional view of the release mechanism.

Referring to FIGURE 1, there is shown an instrument capsule 1 held at the bottom 29 of a body of water 27 and resting on a base 2. The weight of the base attached to the capsule 1 holds the capsule at the bottom. The capsule is buoyant and would float to the surface if not held down, on one side by the arm 3 secured to the base or platform 2 and overlapping the member 4 of the capsule and, on the other side, by the release mechanism which is attached to the member 7 on the capsule and a shackle 5 on the platform 2.

When it is desired to bring the instrument capsule 1 to the surface of the water to retrieve the data recorded therein, a ship 26 traverses the area, towing a sonar sound head 25 emitting coded signals. The signals from the sonar sound head impinge upon the hydrophone 29 on the capsule 1 and activate amplifier decoder 21 which operates relay 26, in turn closing contacts 23, allowing a current to flow from battery 9 to the release mechanism for releasing the capsule as hereafter explained, permitting the capsule to float to the surface.

In FIGURE 2 a more detailed view of the release mechanism 10 is shown. Said mechanism comprises a main body 11, a pivot arm 12, drop link 15 and a compression spring 14. A fuse wire 25 is attached between the main body 11 and the pivot arm 12 to hold the two in the position shown. It will be noted that the end of drop link 15 rests in an inset in the pivot arm 12. Now, as long as the wire 25 holds the pivot arm 12 in position to engage the end of drop link 15, the release mechanism will hold onto the shackle 5 as shown in FIGURE 1, since said shackle hooks into the groove 16 of the drop link. By sending a current through wires 21 and 24 and through wire 25, wire 25 may be melted, permitting the tension of spring 14 to release the pivot arm 12 outward, disengaging drop lever 15, permitting it to fall and disengage from the shackle 5. Wires 21 and 24, for example, may be insulated copper wires, while wire 25 is a non-corrosive resistive wire, for example, Monel, and may be approximately 0.012 inch in diameter.

The release mechanism 10 will hold the capsule 1 or any other device fast to the supporting platform 2 if the capsule is attached to the eye 26 and the base is secured to the mechanism by means of shackle 5 to the drop link 15 even though there is considerable force tending to separate the capsule from the base. By using metals and alloys which are not effected by salt water, for example stainless steel, the release mechanism will maintain the attachment for unlimited periods of time; yet, when separation is desired, the application of a voltage across the wire 25 will cause the wire to melt, releasing the drop lever 15 and separating the capsule from the base.

To prevent the shorting of the voltage across the wires 21 and 24, wire 21 is attached to an insulating terminal 18 by screw 19, and wire 24 is attached to insulating terminal 22 by screw 23. Insulating terminals 18 and 22 prevent the current from flowing through main body 11, down through pivot arm 12, and effectively shorting out wire 25.

Both the pivot arm 12 and the drop lever 15 are rotatably mounted on hinge pins, arm 12 being mounted on hinge pin 13 and lever 15 being mounted on pin 17. Lever 15 has a notch 16, suitable for seating the shackle, as shown in FIGURE 1.

The compression spring 14 should be of such strength as to overcome any corrosion which may form on the hinge pin 13 and pivot arm 12 which would tend to limit rotation of the arm about pin 13. About 20 pound compression should be suitable to force the pivot arm out the drop lever 15 when wire 25 is melted.

The release mechanism shown in FIGURE 2 is very reliable since it is made of non-corrosive stainless steel and does not depend upon the corrosion effect or an explosive to bring about separation of the capsule 1 from the base 2. All that is required is that a current be applied through wire 25 sufficient to melt it. Since the temperature may be relatively low at depths of 20,000 feet, an insulating covering (not shown) may be placed over wire 25 to limit the amount of current necessary to heat the wire and melt it. Making the wire out of Monel provides a wire of high strength which is not susceptible to deterioration by sea water, thus permitting submersion of the capsule for great periods of time without the possibility of the wire corroding and releasing the capsule at a time before release is desired. Since the release mechanism is attached to the capsule and rises to the surface with the capsule, the mechanism is reusable and not lost.

Although the present invention has been shown and illustrated in terms of a specific preferred embodiment, it will be apparent that changes and modifications are possible without departing from the spirit and scope of the invention as defined in the appended claims.

What is claimed is:
1. A release mechanism for holding two objects together comprising in combination a frame, first and second pivotally mounted levers on said frame, a compression spring mounted between said frame and said first lever to exert a force for rotating said first lever away from said frame, and a wire attached to but insulated from said frame and said first lever, thereby to hold said first lever against said spring and hold said spring in compression, said second lever being supported on one end by said first lever and pivotally mounted at the other end to said frame.

2. A release mechanism comprising in combination a frame, a pivoted arm, a drop lever, a spring and a wire, said pivoted arm being attached to one end of said frame and said drop lever being attached to the other end of said frame, said drop lever being held in position by said pivoted arm, said spring being positioned between said frame and said pivoted arm to rotate said pivoted arm away from said frame to release said drop lever, said wire being attached to said frame and to said pivoted arm to prevent said pivoted arm from being rotated away from said frame and to hold said spring under compression.

3. An electrically controlled release mechanism comprising a frame having two lever arms rotatably mounted on said frame, a compression spring and a fuse wire, one of said lever arms being held in a supported position by an opening at the end of said other lever arm, said other lever arm being biased away from said frame by said compression spring and held in a fixed position by said fuse wire.

4. An electrically controlled release mechanism comprising a frame having a movable drop link, a lever arm rotatably mounted on said frame and supporting said drop link at one end, a compression spring mounted between said frame and said lever arm, and a fuse wire attached to said frame and to said lever arm, whereby on the melting of said fuse wire by an electric current passing therethrough, said compression spring moves said lever arm to release said drop link.

5. A release mechanism comprising a frame having a first lever rotatably mounted on one end thereof and a second lever rotatably mounted on the other end thereof, said first lever supporting one end of said second lever, a compression spring mounted between said frame and said first lever to apply a force in a direction to move said first lever away from said frame to release said second lever, and a fuse wire attached to but electrically insulated from said frame and said first lever to hold said first lever in a fixed position and placing said spring under compression, whereby on the melting of said fuse wire by an electric current passing therethrough, said compression spring rotates said first lever arm to release said second lever arm.

6. The release mechanism as defined in claim 5 wherein said fuse wire is Monel metal.

References Cited by the Examiner
UNITED STATES PATENTS 2,572,255 10/1951 Gallaway _____ 340—7
3,066,325 12/1962 Hayes.
3,163,732 12/1964 Abbott et al. _____ 200—117

BENJAMIN A. BORCHELT, *Primary Examiner.*

P. A. SHANLEY, *Assistant Examiner.*